July 30, 1968    A. R. BARRINGER    3,395,338
PROSPECTING SYSTEM EMPLOYING ELECTROMAGNETIC WAVE
FORMS EXHIBITING ABRUPT CHANGES
Filed June 8, 1965    2 Sheets-Sheet 1

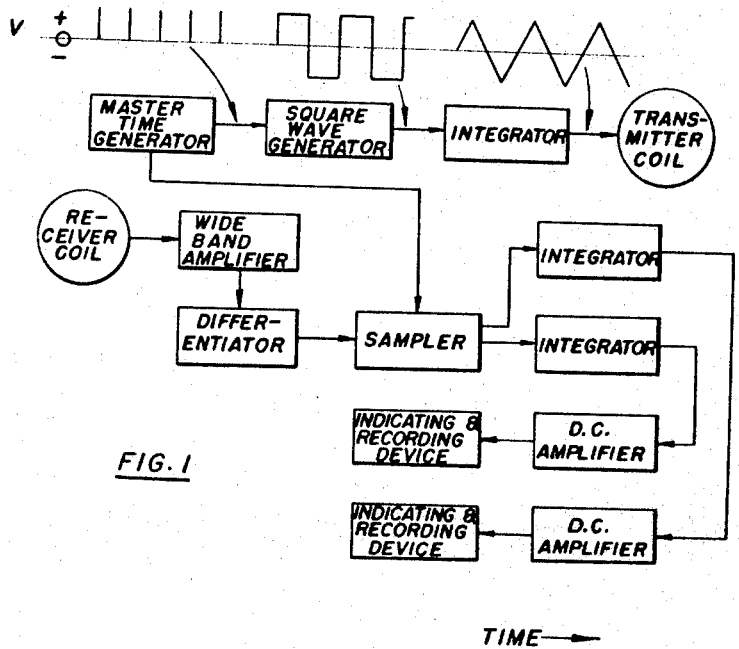

FIG. 1

TIME →

(a) TRANSMITTED PRIMARY FIELD. 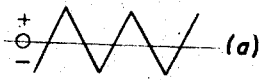 (a)

(b) VOLTAGE IMPRESSED ON RECEIVE COIL BY PRIMARY FIELD WITH NO CONDUCTING BODIES PRESENT. 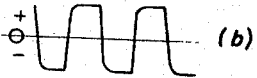 (b)

(c) POSSIBLE RESULTANT FIELD DUE TO SUM OF PRIMARY FIELD & FIELD FROM NEARBY CONDUCTING BODY. 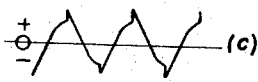 (c)

(d) EXAMPLE OF VOLTAGE IMPRESSED ON RECEIVE COIL BY RESULTANT FIELD. 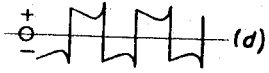 (d)

(e) EXAMPLE OF VOLTAGE AT OUTPUT OF DIFFERENTIATOR IN RECEIVER. 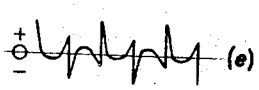 (e)

FIG. 2

INVENTOR:
ANTHONY R. BARRINGER

BY: *Cavanagh & Norman*

July 30, 1968 A. R. BARRINGER 3,395,338
PROSPECTING SYSTEM EMPLOYING ELECTROMAGNETIC WAVE
FORMS EXHIBITING ABRUPT CHANGES
Filed June 8, 1965 2 Sheets-Sheet 2

INVENTOR:
ANTHONY R. BARRINGER

BY: *Cavanagh & Norman*

United States Patent Office 3,395,338
Patented July 30, 1968

3,395,338
PROSPECTING SYSTEM EMPLOYING ELECTROMAGNETIC WAVE FORMS EXHIBITING ABRUPT CHANGES
Anthony Rene Barringer, Willowdale, Ontario, Canada, assignor to Selco Exploration Co. Ltd., Toronto, Ontario, Canada
Filed June 8, 1965, Ser. No. 462,203
6 Claims. (Cl. 324—6)

ABSTRACT OF THE DISCLOSURE

This specification discloses in part a prospecting system for locating both conductive and non-conductive ore bodies and deposits by means of radiating of primary electomagnetic wave forms exhibiting predetermined time varying characteristics and abrupt changes in such time varying characteristics, such abrupt changes inducing in turn secondary transient signals emanating from such ore bodies and deposits, and detecting such secondary transient signals at a time when the primary field is again exhibiting predetermined time varying characteristics.

---

This invention relates to a method of and apparatus for detecting conducting ore bodies.

Certain known methods of electromagnetic systems are of the type of detection method wherein a transmitter with loop creates a primary electromagnetic field in the vicinity of an area being tested for conducting anomalies and a receiver with loop tests the resultant field which is the superimposed result of the primary field and a secondary electromagnetic field induced by the effect of the primary field on the conducting ore body.

The characteristics of the secondary electromagnetic field indicate the dimensions and conductivity of the anomaly.

The presently preferred method of measuring such a secondary electromagnetic field is to create a primary field having abrupt discontinuities separated by periods when no primary field exists or when it appears not to vary with respect to time. By measuring the so-called "resultant field" during the period when the primary field is non-existent, or is detected as being unvarying, a result is obtained which is due only to the non-linear transient portions of the secondary field and hence to the electrical characteristics of the ore body. Crude examples of such systems are shown in various granted patents including: United States Patent No. 2,527,559 to Lindblad et al. and United States Patent No. 2,735,980 to Wait. While such discontinuous systems are substantial improvements over the well known continuous wave systems the operation of the receiver portion of the systems has tended to be unnecessarily complex and the results produced were difficult to interpret and tended to be highly erratic and subjective.

A greatly improved system is disclosed in Canadian Patent No. 673,503 to Barringer, dated Nov. 5, 1963. In Barringer a wave form exhibiting "abrupt discontinuities" is transmitted. The voltage induced in an ore body has a sharp transient wave form since it is proportional to the rate of change of the transmitted field. The current induced in the ore body and hence the secondary field are thus in the form of decaying transients. Measurement of the secondary field preferably takes place after the period of "abrupt discontinuity." The "abrupt discontinuity" refers to a sudden change in the rate of change of the transmitted electromagnetic field, such change taking place in a time period which is a fraction of the time constant of the conductive or polarizing body which it is desired to detect. The time constant of a conductive or polarizing body is defined as the time taken for an induced eddy current in the body to collapse to approximately one third of its amplitude following the instantaneous removal of the primary energizing field which is the source of the eddy currents. When the transmitted field is off or appears not to be time varying when detected, by the use of suitable receiving techniques said measurement can in fact be made by discriminating that portion of the received signal which does not conform to the transmitted wave form, whether linear or non-linear. As disclosed in said Canadian Letters Patent No. 673,503, such discontinuities may comprise any departure from the simple harmonic function such as pulsed currents at spaced intervals or regular wave forms such as square wave forms or sawtooth wave forms, or in fact any wave form other than the simple harmonic function wherein a portion exhibits a rate of change which is abrupt. Both square wave and sawtooth wave forms are well known in the art, being illustrated generally in United States Patent No. 2,527,559 to Lindblad. In any event, however, the wave form of the secondary electromagnetic field radiated from the ore body will follow and conform to the shape of the wave form of the primary field except during the brief period following the abrupt discontinuities in the primary wave form when the secondary field is, as stated, of transient form dependent upon the characteristics of the ore body. It will therefore be apparent that it is only this transient portion of the secondary field which can be separated from the primary field and is available for supplying information. Where the transient portion is separated by gating out the signal due to the primary field then the only signal detected is that due to the transient portion of the secondary field. On the other hand, where the total resultant signal is received the secondary field portion which conforms to the primary field will be undetectable, or inseparable from the primary field, and only the transient secondary field portion will be separable.

In general this system samples the transients at spaced intervals and produces a more intelligible result which can be plotted and enumerated without the highly subjective interpretation required in prior art systems and in addition the system produces a stronger transient signal which can be measured with greater accuracy.

When using symmetrical sawtooth type currents to radiate the primary field, which may be desirable in some cases, the resultant primary field is of course detected as a square wave linear form and as a result it is possible by well known techniques to eliminate or cancel such primary field and sample the transient secondary field during the existence of such primary field.

Other types of wave forms having abrupt discontinuities, such as linked exponential wave forms may also be used without departing from the invention, where suitable methods are employed for cancelling out the received signal due to the primary wave form and in fact any shape of discontinuity which is a departure from the simple harmonic wave form function, and which is short in relation to the time constants of the particular ore bodies, conductors and the like, may be employed within the scope of the invention of Canadian Letters Patent No. 673,503.

It is an objective of the invention to provide a simple method of utilizing any wave form of any shape whatever having abrupt discontinuities separated by intervals when the wave form is of any predetermined wave shape whether varying linearly or non-linearly with respect to time.

It is a further object of this invention to provide a method and apparatus which can utilize any periodic signals having portions of the cycle where a constant rate of change of signal strength exists. Thus, the apparatus and method may use (but is not limited to) sawtoothed forms.

It is a further object of the invention to provide a method of where a relatively large proportion of the power of the transmitted field can be at the lower frequency range and in the order of the frequency of the transmitted field where it is most useful in the detection of valuable ore bodies, it being well understood that valuable ore bodies respond better to low frequency fields.

Where the transmitted field is generated by pulsed currents at spaced intervals then the receiver will operate by gating out the signal due to the primary field as disclosed in Canadian Patent No. 673,503. Where the signal is a periodic signal which, for a portion of the signal, varies linearly with time, that is to say, a variation at a rate other than zero, such as a sawtooth wave form, the voltage impressed on the receiving coil by the resultant field is the differential of or is proportional to the rate of change of the resultant field, and it will be seen that the receiving coil voltage is the result of a differentiation operation performed through the receiving loop characteristics on the resultant signal. The resultant signal may, if desired, be separated into two components, one due to the primary field and the driven portion of the secondary induced field, and the other being due to the transient portions of the secondary induced field by any known means such as a differentiator, with the result that the said portions of signals that vary linearly with time give a wave form in which the combined effect of the transmitted primary field, and the driven or non-transient portion of the secondary induced field is separated away from the transient growth and decay of the secondary induced field.

The portion of the signal which varies linearly with time varies at a rate other than zero and the differentiation operation performed at the receiver loop creates in the receiver loop an impressed voltage signal during the linear variation portion having a primary field component and a driven secondary field component of constant, non-zero value, together with the transient secondary field component. The impressed voltage signal is again differentiated and in the resultant signal, during the linear variation periods, the primary field component together with the non-transient portion of the secondary field will then be zero and the resultant signal during such periods will be solely due to the transient growth and decay portions of the secondary field. By sampling the signal resulting from the double differentiation during the linear variation interval, a measure of the characteristics of the area being surveyed may be obtained.

However, it will be understood that the employment of a differentiator in this way is a crude and elementary expedient and in fact results in the enhancement of noise signals which substantially impair the efficiency of the operation.

In the case of wave forms having periodic discontinuities which are followed by non-linear signal variations of exponential wave shape the same method may also be employed in conjunction with a further or third differentiation step in the manner described below. However, this further degrades the signal to noise ratio and it is therefore preferable that discrimination of the transient signal portion be carried out, according to a further embodiment of the invention as described below without second or third differentiation, which method is applicable both to linearly and non-linearly time varying signals, whether having sawtooth, exponential or other complex wave forms exhibiting abrupt discontinuities, with a substantial gain in signal clarity and reduction in noise.

In the drawings which illustrate a preferred embodiment of the invention;

FIGURE 1 is a schematic drawing of a transmitter and receiver for performing a survey in accord with one form of this invention;

FIGURE 2(a) shows the time graph of the transmitter field using the apparatus of FIGURE 1;

FIGURE 2(b) shows the time graph of the voltage induced into the receiver coil resulting from the primary field only in the absence of a secondary field;

FIGURE 2(c) shows the time graph of a resultant field where a secondary field has been created by the field of FIGURE 2(a);

FIGURE 2(d) shows the time graph of the voltage induced in the receiver coil as a result of the induced field of FIGURE 2(c);

FIGURE 2(e) shows the time graph of the signal resulting from differentiation of the voltage signal of FIGURE 2(d);

Figure 3:
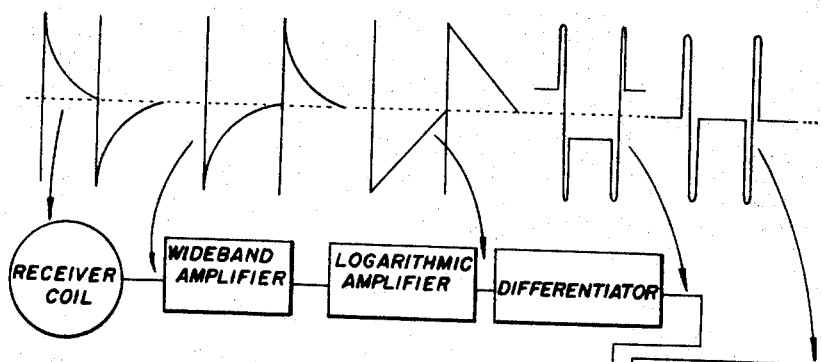
FIGURE 3 shows a modification of the circuit of FIGURE 1 for use with non-linear periodic signals.

In FIGURE 1 is shown a master time generator from which periodic pulses evenly spaced in time are developed, and these are fed through a connector to a square wave generator for conversion to square waves. A connection supplies the square waves to an integrator for conversion to sawtoothed waves, and these in turn are fed through a connection to a transmitter coil which transmits waves of the sawtoothed form. The sawtoothed waves supplied to the transmitter coil are each composed of equal upwardly and downwardly sloping portions, linearly varying with time and wherein the field created by the transmitter coil is existent except during the instants of time when the field goes through zero value while changing from a positive to a negative value or vice versa. Although the invention is operable with any field whose strength over sustained intervals varies linearly with time, the preferable form of field, from the point of view of ease of observation, is one in which the field strength varies between positive and negative maxima which are substantially equal in absolute value to one another as in the example here.

A receiver coil is preferably connected through a wide band amplifier to a differentiator. The output of the differentiator is connected to a sampler and the master time generator is also connected to the sampler. The sampler is designed to provide outputs resulting from sampling the differentiator output at least once and preferably twice per signal period. The sampler is designed to be synchronized to the period of the transmitted field, so that sampling takes place at times when the transmitted (i.e. primary) field is varying linearly with time, and this synchronism is controlled by the connection from the master pulse generator.

The sampler is preferably an adjustable electronic detector circuit such as is disclosed in said Canadian Letters Patent No. 673,503 which is adjusted so as to insure that sampling takes place when the primary field is varying linearly with time.

The two sampler outputs are separately indicated and recorded to detect the existence of ore bodies, if present. The sampler outputs are preferably, and as shown, integrated and amplified before detection and recording.

In describing the operation of the system of FIGURE 1, it will be understood that the transmitter and detector loop for use in detecting ore bodies may together be mounted on the ground on a vehicle or in a boat or aircraft. In operation, the sawtoothed field is transmitted as indicated in FIGURE 2(a). Satisfactory frequencies are in the order of 150 cycles per second and, when hunting for massive sulphides, it is desirable to keep the frequency in this order. When frequencies of the order of 500 cycles per second are used, there is a tendency to get poorer response from massive ore bodies of long time constant. Frequency selection is well-known to those skilled in the art. When frequencies of, say, in the order of 160 cycles per second are used with a wave form of the type described, a large percentage of the power of the transmitted field is at the lower frequencies where good response is obtained, as indicated from massive sulphide ore bodies. In the absence of a conducting ore body, it will be seen that the resultant field will correspond to the primary field and the voltage induced in the receiver coil, being the differential of the field, will be a square wave with horizontal crests and troughs corresponding to the linearly varying portion of the primary field and with substantially vertical sides, as indicated in FIGURE 2(b). As a result, the differentiator output, in this event, will be zero during the intervals corresponding to the linearly varying portions of the primary field, such intervals being separated by sharp pulses. Thus, the sampler, producing output during the linearly varying portions of the primary field, will indicate zero signal detected to the indicator.

If an ore body is present, then the resultant field will be the superimposed results of the primary and secondary field and the secondary field will, of necessity, be lesser in magnitude, the resultant field being as indicated in FIGURE 2(c). The resultant voltage impressed on the receiver coil is shown in FIGURE 2(d) wherein it will be noted by reference to FIGURE 2(b) that the primary field component is, during the linearly varying portion of the field, a horizontal extent. Thus, the differentiator output will have pulses separated by intervals corresponding to the linearly varying portions of the field, where the primary field component of the differentiator output signal is zero. Thus, when the differentiator output is sampled during the linear portions, the resultant detected signal is characteristic only of the existence and conducting characteristics of the ore body.

One limitation of this system is the fact that in order to operate it satisfactorily it is necessary that the transmitter should deliver as nearly as possible a perfectly linear output and, in practice, this is difficult to achieve. According to a further embodiment of the invention therefore, use may be made of a transmitter having an exponential output which is easy to build according to well known techniques. When using such an output, the primary field will therefore exhibit a wave form of exponential shape and the voltage impressed on the receiving coil by such wave form will be the differential of such primary wave form. It will of course be understood that the differential of an exponential curve is also an exponential curve and this will in fact be the wave form of the signal induced in the receiving coil. According to one technique, as illustrated generally in the block diagram of FIGURE 3, a logarithmic amplifier is included in the receiver circuit before the differentiator and, as is well known in the art, when such an exponential signal is applied to a logarithmic amplifier the output is of linear sawtooth shape as illustrated schematically in FIGURE 3. Such sawtooth shape signal when applied to the differentiator will result in spaced apart signal pulses separated by periods of steady output of positive and negative value and this signal is then applied to a second differentiator with the result that the output then appears as spaced signal pulses having positive and negative excursions separated by periods of zero output. Obviously, any received signal resulting from transient portions of the secondary induced field will appear during such periods of zero output and can be sampled and passed to an indicating and recording device as described in connection with FIGURE 1.

The use of one or more differentiators in this way would not in fact constitute any great advance to persons skilled in the art and it would be apparent from Canadian Letters Patent No. 673,503 that, when using certain types of transmitted wave forms such as sawtooth wave forms and exponential wave forms that the employment of second and third differentiation steps would provide an elementary method of achieving separation of the signal resulting from the primary field, together with the signal resulting from the non-transient portions of the secondary induced field on the one hand, from the transient growth and decay portions of the secondary induced field on the other hand. However, it would also be apparent that the use of one or more differentiators in the receiver circuit in this way will accentuate rapidly time varying noise impulses which result from rapidly time varying noise fields which are picked up in the receiving coil and are generated by the pre-amplifying circuit.

Figure 5:
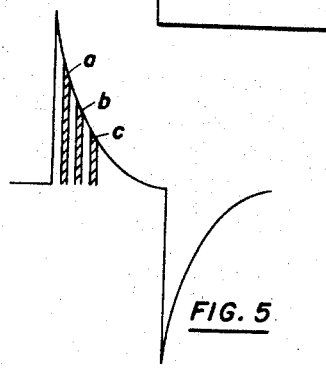
FIGURE 5 is a schematic illustration of the operation of the circuit of FIGURE 4.
Figure 4:
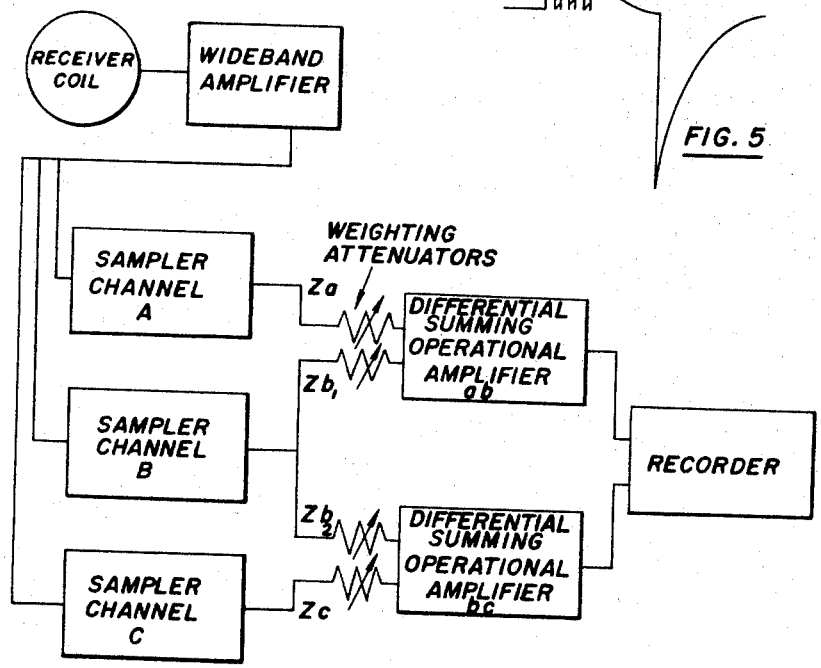
FIGURE 4 shows a block diagram of a further embodiment of a receiver circuit having improved noise rejections.

According to a further embodiment of the invention, such second and third differentiation steps may be dispensed with and the transient growth and decay portions of the secondary induced field may be sampled directly from the receiver coil output by the use of discriminating techniques cancelling out the effect of the signal induced by the primary field together with the signal induced by the non-transient portions of the secondary induced field. Such further embodiment is illustrated in FIGURES 4 and 5 and consists essentially in the sampling of the signal output of the receiver coil at at least two points, and so adjusting the output of one receiving channel relative to another that, when no ore body is present, and therefore no secondary field is induced, the output of one sampling channel relative to another is always in a fixed ratio. By suitable amplification of one sampling channel or attenuation of another sampling channel, the two outputs can be made to be self-cancelling when no ore body is present. However, when an ore body is present and when transient effects are present in the receiver coil output then the ratio of the outputs of the sampling channels will change and the combined output of any two sampling channels will not be self-cancelling and the resultant signal may be recorded as giving information concerning the ore body. While the invention is of course applicable to only two sampling channels more information will be available where three or more sampling channels are used and FIGURE 4 is an illustration of the use of three sampling channels. In FIGURE 4 the receiver coil output, after amplification is passed to three sampling channels $a$, $b$ and $c$ which are set to sample the receiver coil output at predetermined time intervals after the abrupt discontinuities in the primary wave forms which, in this particular illustration, are to be understood as being exponential wave forms substantially as illustrated in connection with FIGURE 3, although in fact any wave form exhibiting any abrupt discontinuity may be utilized in the present invention. Such abrupt discontinuities include complex wave forms which contain numerous harmonics of the fundamental periodicity of the wave form. The overall requirement is for abrupt discontinuities in the wave from in which the rate of change of the electromagnetic field alters both substantially and suddenly i.e. in a period which is a fraction of the time constant of conductive or polarizable bodies which it is desired to detect. Such time intervals are in the case of an exponential wave form of equal extent whereby the ratio between the outputs of sampler channel $a$ and sampler channel $b$ will always be the same as the ratio between the outputs of sampler channel $b$ and sampler channel $c$, when no conducting or polarizable body is present, this being an inherent characteristic of an exponential type of wave form. The adjustable weighting attenuator $za$ is provided in sampler channel $a$ and connected to a differential summing operational amplifier $ab$ which is in turn connected to a recorder. The output of sampler channel $b$ is split and passed through two adjustable weighting attenuators $zb1$ and $zb2$, $zb1$ being connected to differential summing operational amplifier $ab$ and $ab2$ being connected to differential summing operational amplifier $bc$. Sampler channel $c$ is connected through adjustable weighting attenuators $zc$ to differential summing operational amplifier $bc$. The output of differential summing operational amplifier $bc$ is also connected to the recorder. The setting of attenuators $za$, $zb1$, $zb2$ and $zc$ is so arranged and determined that the combined outputs of the amplifiers $ab$ and $bc$ is self-cancelling, and produces a signal for operation of the recorder only when a conductive or polarizable body is present thereby giving rise to transient portions of a secondary induced signal which distort the shape of the signal developed in the receiver coil. FIGURE 5 illustrates schematically the location of the sampling channels $a$, $b$ and $c$ on a typical schematic exponential wave form. It will will be seen that the method described in relation to FIGURE 4 and FIGURE 5, is virtually universal in application and is capable of operating on any transmitted wave forms of any shape whatever exhibiting abrupt discontinuities spaced by periods of predetermined wave shape. In addition, the problem of accentuation of noise signals which is inherent in the use of differentiators is no longer present.

It will be understood that the method of constructing components here indicated by blocks are each well-known to those skilled in the art, so that it is not deemed necessary to discuss any such component in detail.

The foregoing is a description of a preferred embodiment of the invention which is here made by way of example only. The invention is not to be taken as limited to the specific steps described but comprehends all such variations that come within the spirit and scope of the appended claims.

What I claim is:

1. The method of detecting conducting bodies and massive and disseminated ore deposits and other polarizable bodies, said bodies having time constants and comprising: creating a primary time varying electromagnetic field exhibiting periodic abrupt changes in the rate of said time variation, said abrupt changes having a duration which is a fraction of the time constant of a said body thereby to induce transient secondary electromagnetic effects radiating from said body a short time after said abrupt changes, said primary field exhibiting a predetermined time variation characteristic immediately following said abrupt changes; detecting said primary time varying field together with said transient secondary effects as a signal which is a differential thereof; sampling said signal at least twice at predetermined intervals spaced after said abrupt changes in said primary field; differentially amplifying said signal samples to predetermined differing amplitudes to establish a predetermined sample amplitude ratio indicating the absence of said transient secondary effects; and adding said signal samples to produce a drive signal for operation of recorder means.

2. The method of detecting conducting bodies and massive and disseminated ore deposits and other polarizable bodies, said bodies having time constants and comprising: creating a primary time varying electromagnetic field exhibiting periodic abrupt changes in the rate of said time variation, said abrupt changes having a duration which is a fraction of the time constant of a said body thereby to induce transient secondary electromagnetic effects radiating from said body a short time after said abrupt changes, said primary field exhibiting a predetermined time variation characteristic immedately followng said abrupt changes; detecting said primary time varying field together with said transient secondary effects as a signal which is a differential thereof; sampling said signal at least twice at predetermined intervals spaced after said abrupt changes in said primary field; differentially amplifying said signal samples to predetermined differing amplitudes to establish a predetermined sample amplitude ratio indicating the absence of said transient secondary effects; applying respective signal samples to recorder means; and operating said recorder means to show a regular record where said signal samples exhibit such predetermined ratio, and to show departures from said regular record where said signal samples depart from said ratio.

3. The method of detecting conducting bodies and massive and disseminated ore deposits and other polarizable bodies, said bodies having time constants and comprising: creating a primary time varying electromagnetic field exhibiting periodic abrupt changes in the rate of said time variations, said abrupt changes having a duration which is a fraction of the time constant of a said body thereby to induce transient secondary electromagnetic effects radiating from said body a short time after said abrupt changes, said primary field exhibiting a predetermined time variation characteristic immediately following said abrupt changes; detecting said primary time varying field together with said transient secondary effects as a signal which is a differential thereof; sampling said signal at least three times at predetermined equal intervals spaced after said abrupt changes in said primary field; adjustably attenuating said signal samples to predetermined differing amplitudes to establish predetermined amplitude ratios between adjacent samples; applying respective signal samples to recorder means; and operating said recorder means to show a regular record where said signal samples exhibit said predetermined ratio, and to show departures from said regular record where said signal samples depart from said ratio.

4. The method of detecting conducting bodies and massive and disseminated ore deposits and other polarizable bodies, said bodies having time constants and comprising: creating a primary time varying electromagnetic field exhibiting periodic abrupt changes in the rate of said time variation, said abrupt changes having a duration which is a fraction of the time constant of a said body thereby to induce transient secondary electromagnetic effects radiating from said body a short time after said abrupt changes, said primary field exhibiting a predetermined time variation characteristic immediately following said abrupt changes; detecting said primary time varying field together with said transient secondary effects as a signal which is a differential thereof; sampling said signal at least three times at predetermined equal intervals spaced after said abrupt changes in said primary field; dividing an intermediate signal sample into two sample portions and adjustably attenuating said portions to predetermined amplitudes to establish predetermined amplitude ratios between the same and adjacent signal samples; adding together adjacent signal sample pairs, said pairs comprising a said portion of said divided signal sample and an adjacent signal sample and differentially amplifying respective added signal sample pairs to predetermined amplitudes; and comparing the amplitude of said signal samples to determine the presence of any departure from said predetermined characteristic of said primary field, said departure indicating the presence of said transient secondary effects.

5. The method of detecting conducting bodies and massive and disseminated ore deposits and other polarizable bodies, said bodies having time constants and comprising: creating a primary time varying electromagnetic field exhibiting periodic abrupt changes in the rate of said time variation, said abrupt changes having a duration which is a fraction of the time constant of a said body thereby to induce transient secondary electromagnetic effects radiating from said body a short time after said abrupt changes, said primary field exhibiting a predetermined time variation characteristic immediately following said abrupt changes; detecting said primary time varying field together with said transient secondary effects as a signal which is a differential thereof; sampling said signal at least three times at predetermined equal intervals spaced after said abrupt changes in said primary field; dividing an intermediate signal sample into two sample portions to predetermined amplitudes and adjustably attenuating said portions to establish predetermined amplitude ratios between the same and adjacent signal samples; adding together adjacent signal sample pairs to predetermined amplitudes, said pairs comprising a said portion of said divided signal sample and an adjacent signal sample and differentially amplifying respective added signal sample pairs; applying respective added signal samples to recorder means; and operating said recorder means to show a regular record where said signal samples exhibit a predetermined ratio, and to show departures from said regular record where said signal samples depart from said ratio.

6. The method of detecting conducting bodies and massive and disseminated ore deposits and other polarizable bodies, said bodies having time constants and comprising: creating a primary time varying electromagnetic field exhibiting periodic abrupt changes in the rate of said time variation, said abrupt changes having a duration which is a fraction of the time constant of a said body thereby to induce transient secondary electromagnetic effects radiating from said body a short time after said abrupt changes, said primary field exhibiting a predetermined time variation characteristic immediately following said abrupt changes; detecting said primary time varying field together with said transient secondary effects as a signal which is a differential thereof; sampling said signal at least twice at predetermined intervals spaced after said abrupt changes in said primary field; amplifying said signal to procure a signal having linear time varying characteristics where no secondary transients are present, said characteristics corresponding to said primary time varying field; differentiating said signal thereby to convert said linear time varying portions thereof into square wave portions; further differentiating said signal to eliminate said square wave portions thereby to isolate said transient portions therefrom; and recording the presence of said transient portions.

References Cited

UNITED STATES PATENTS

| | | | |
|---|---|---|---|
| 2,527,559 | 10/1950 | Lindblad et al. | 324—6 |
| 2,685,058 | 7/1954 | Yost | 324—6 X |
| 2,735,980 | 2/1956 | Wait | 324—7 |
| 3,090,910 | 5/1963 | Moran | 324—6 |
| 3,105,934 | 10/1963 | Barringer | 324—6 X |
| 3,210,652 | 10/1965 | Seigel | 324—6 X |
| 2,657,380 | 10/1953 | Donaldson | 324—6 XR |

FOREIGN PATENTS 117,082  8/1946  Sweden.

RUDOLPH V. ROLINEC, *Primary Examiner.*

G. R. STRECKER, *Assistant Examiner.*